US008332470B2

(12) United States Patent
Arun et al.

(10) Patent No.: US 8,332,470 B2
(45) Date of Patent: Dec. 11, 2012

(54) METHODS AND APPARATUS PROVIDING COLLABORATIVE ACCESS TO APPLICATIONS

(75) Inventors: Gopalan Arun, Nashua, NH (US); Ramesh Vasudevan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 2038 days.

(21) Appl. No.: 11/291,352

(22) Filed: Nov. 30, 2005

(65) Prior Publication Data
US 2007/0124374 A1    May 31, 2007

(51) Int. Cl.
G06F 15/16    (2006.01)
(52) U.S. Cl. .................................. 709/204; 709/218
(58) Field of Classification Search ............. 709/204, 709/218
See application file for complete search history.

(56) References Cited

U.S. PATENT DOCUMENTS

| | | | | |
|---|---|---|---|---|
| 5,623,655 | A * | 4/1997 | Chisaka ............................. | 1/1 |
| 5,649,105 | A * | 7/1997 | Aldred et al. .................... | 709/220 |
| 6,343,316 | B1 * | 1/2002 | Sakata ............................. | 709/213 |
| 2002/0010744 | A1 * | 1/2002 | Prell et al. ....................... | 709/205 |
| 2002/0173984 | A1 * | 11/2002 | Robertson et al. ................. | 705/1 |
| 2003/0131104 | A1 * | 7/2003 | Karamanolis et al. ........... | 709/225 |
| 2005/0165859 | A1 * | 7/2005 | Geyer et al. ..................... | 707/201 |
| 2006/0053380 | A1 * | 3/2006 | Spataro et al. ................... | 715/753 |
| 2007/0124375 | A1 * | 5/2007 | Vasudevan et al. ............. | 709/204 |

* cited by examiner

Primary Examiner — Boris Gorney

(57) ABSTRACT

A system, method and apparatus provide collaborative access to an application by identifying an application from a set of independently operable applications to be accessible from a collaborative workspace. The system creates an application container within the application for storage of application data on behalf of users accessing the application from the collaborative workspace and creates a workspace container within the collaborative workspace that includes workspace metadata that identifies the application and that provides collaborative users access to the application from the collaborative workspace. The system provides collaborative access to the application on behalf of users in the collaborative workspace. The collaborative access allows users to access the workspace metadata to identify and gain access to the application and allows the users access to the application data maintained by the application within the application container.

27 Claims, 10 Drawing Sheets

METHODS AND APPARATUS PROVIDING COLLABORATIVE ACCESS TO APPLICATIONS

BACKGROUND

Modern information processing systems operate various software applications that allow users to accomplish a variety of tasks in an efficient manner. In a business setting, multiple users of computer systems often work together or collaboratively on a task or project as part of the team. The collaborative task may be big or small and usually involves contributions from each of the individual team members that collectively go together towards the completion of the collaborative project. While working on the project, the members of the team often utilize different software applications for different purposes. As an example, a project manager may use an electronic mail application to send notifications concerning project details to individual members of the team. Individual team members may use a calendar or appointment application to schedule meetings to discuss aspects of the project. Team members may individually use content production tools or development applications such as word processors, software development tools or the like to produce individual portions of content that are combined into the final output of the project. The team may configure a region of a file server with a designated storage area for maintaining files associated with the collaborative project. By working as a team using the various software tools and applications, the team members can combine efforts to more efficiently complete the project.

SUMMARY

Conventional approaches to performing collaboration between members of a team working on a common task or project suffer from a variety of deficiencies. In particular, using conventional technologies, collaboration between team members typically involves individual members of the team using software applications independently of each other in an attempt to collaborate with other members of the team. As an example, for content creation, conventional collaboration techniques typically involve the team members agreeing on a common storage location such as a directory of a server for storing files and data or other content created as part of the project. It is up to the individual team members to enforce this decision and errors often arise from a team member inadvertently storing files or content in an incorrect file server location. Likewise, when communicating between team members using applications such as electronic mail, it is left up to a team member transferring the electronic mail to include the appropriate other team members on the project as recipients of the electronic mail. If the user sending the electronic mail forgets a particular team member, confusion can result due to that team member being left out of communication. As another example, individual team members utilize electronic mail, calendar and file sharing applications independently of each other and must manually keep track of relationships between entities (e.g., e-mails, files, appointments) created by these respective applications, even though content generated by each application is semantically related to the project. Conventional collaboration techniques do not provide an efficient mechanism to interrelate the various applications used in a collaborative project on behalf of a group of users of those applications. As a result of these inefficiencies, conventional collaboration techniques that utilize software applications independently of each other suffer from general disorganization.

Conventional approaches that provide collaboration software in the form of bundled packages or collaborative application suites that include one or more of the above-identified processing requirements also suffer from a variety of deficiencies. In particular, conventional approaches that provide bundled collaboration software often compromise the independence of the individual applications provided within the bundle by either not providing access to the applications outside of the collaboration software bundle or by restricting functionality or operation of the applications when accessed within the collaboration software. In conventional collaboration packages that present independently operable software applications in a bundled collaboration or workgroup setting, such conventional techniques only provide a shallow portal-like visual unification of such software applications rather than a deep semantic unification. As an example, existing collaboration software applications that provide a wrapper-like shell around separate applications do not solve issues related to variations in access control and user privileges between the different applications. Likewise, such conventional systems rely on maintaining application data related to collaborative activities separately from the application itself. Accordingly, if the application is accessed from outside of the collaboration suite, the collaborative data must be copied to an area that is accessible to non-collaboration users thus resulting in data duplication. Further still, in certain conventional collaboration approaches, applications included in the collaborative bundle or data produced from these applications are not accessible at all outside of the collaboration setting. Such conventional collaboration systems often maintain application data locally to the collaboration application itself thus resulting in a requirement to copy or even possibly transform data if a user desires to access information in an application that executes independently of the collaboration system.

Embodiments disclosed herein significantly overcome such deficiencies and provide a system, methods and apparatus that operate to provide collaboration software that allows integration of a set of independently executable software applications within a collaboration workspace that is unified using workspace metadata. In embodiments disclosed herein, the content created by each application, such as a file in a calendaring system or a mailbox in an electronic mail application, is maintained by that application as if the application were executing independently of the collaborative workspace, but such content and data are logically included within the collaboration workspace through workspace metadata that maintains information about each software application available to users in the collaborative workspace. In the approach disclosed herein, multiple applications needed for managing personal or team information are unified by including their metadata concerning the applications, but not the application data itself, in a native database workspace. All the application content and associated privileged information are physically stored in the application itself, and the metadata stored in the workspace itself is sufficient for locating the application content in the application and for performing functions such as user and application privilege and name mapping thus allowing users collaborative access to such application content.

In operation of the system disclosed herein, an administrator of a collaborative workspace can create a new collaborative workspace for a particular project or task and can identify applications from a set of independently operable applications to be accessible from a collaborative workspace, as if the collaborative workspace were a user of the application itself, but with privileged levels associated with the user logged into the collaborative workspace. For each application included within the collaborative workspace, the administrator can operate the system disclosed herein to create a container within the application for storage of application data on behalf of users accessing the application from the collaborative workspace. In this manner, all application data is managed by the individual applications themselves. The system provides a collaboration manager that creates a workspace container within the collaborative workspace. The workspace container includes workspace metadata that identifies each application included in the workspace and that provides collaborative users access to the application from the collaborative workspace using the metadata to properly map access privilege levels as well as identify collaborative content in the application container for that application for that workspace. The workspace metadata is generally a repository for storing metadata needed for maintaining workspaces and identifying and providing shared user access to applications and their collaborative content.

By way of example, suppose an administrator establishes a collaborative workspace that includes a file management application, a calendaring application, an electronic mail application and a discussion application (e.g., a threaded discussion forum). In response, the system operates as explained herein to create application containers within each of these applications for storage of content produced from operation of the collaborative workspace. The application containers include, for example, a folder (e.g., a root level directory or path) in the file management application for storing all the file content produced by users when logged into the workspace, a special user and calendar repository in the calendaring application for storing all the meeting and appointment data created in the workspace, a mailbox and workspace user mail account in the electronic mail application for transmission and reception of electronic mail messages on behalf of the collaborative workspace, and a discussion facility created in the discussion application for storing all the discussion topics created by users in the workspace. The system also creates workspace metadata that maintains application mapping information that identifies the aforementioned application containers of each application for that workspace.

Configurations of the system disclosed herein provide a secure environment for information management by hiding the complexities of different access control models of different applications included in the workspace behind a unified rule-based access control model. Access to workspace content is controlled by assigning roles to workspace users. A role is a collection of privileges available for access to entities of the respective applications by a user assigned to that role. Roles can be system defined or user-defined. As an example, administrator, reader and writer are examples of system defined roles while scientist and engineer are examples of user-defined roles. The workspace roles are mapped in the workspace metadata to native access control constructs of each application. Thus if privileges specific to one application are different for other applications, the collaboration manager disclosed herein can map such privilege levels to user roles assigned to users logged into the workspace and as a user uses one application, privileges appropriate to that users' role for that application are applied, and when the user switches to another application, privileges for that other application that are appropriate for the users' role are applied, so that access control is uniform between applications as defined by that user role.

Depending upon the configuration, the workspace metadata further includes workspace properties such as a name, description, path, owner and other general properties associated with the workspace, as well as information about relationships created between workspace entities contained in different applications and fault tolerance information. For example, the workspace metadata can maintain a relationship between files stored in the file management application that are attached to a meeting scheduled in the calendaring application. Using the techniques disclosed herein, the system provides collaborative access to the applications included in the workspace on behalf of users in the collaborative workspace, but as if the workspace were a user to those applications (but at a privilege level commensurate with that user controlling the workspace). Such collaborative access allows users to access the workspace metadata to identify and gain access to the applications and allows the users access to the application data maintained by the application within the application container as if the collaborative workspace were a user of the application.

Additionally, by providing access to applications using the metadata unification approach disclosed herein, specific applications required for one aspect of the collaborative workspace can be replaced with another application without significantly impacting the viability of the workspace. As an example, if the workspace is initially configured for use with an electronic mail application that is later replaced with a different electronic mail application, the administrator can reconfigure the workspace to use the new electronic mail application without disrupting the other applications. Additionally, since each application is configured with an application container associated with the workspace to maintain application data for the application for access by users of the collaborative workspace, the collaborative workspace itself does not need to maintain its own application data repository thus reducing storage and data duplication requirements.

Certain embodiments disclosed herein include a computerized device, such as a host or server computer system, workstation, personal or handheld computer or other computerized device configured to process all of the collaboration method and processing operations disclosed herein. In such embodiments, the computerized device includes a memory system, a processor, a communications interface and an interconnection mechanism connecting these components. The memory system is encoded with a collaboration manager software application that when performed on the processor, produces a corresponding collaboration manager process that operates as explained herein within the computerized device to perform all of the processing embodiments and operations disclosed herein, and equivalents thereto. It is to be understood that the collaboration system can be distributed, or operated locally in one or more computer systems.

Certain arrangements that are disclosed herein include software programs and systems to perform the method embodiment steps and operations summarized above and disclosed in detail below, and equivalents thereto, in any combination with each other. More particularly, a computer program product is disclosed that has a computer-readable medium including computer program logic encoded thereon that when performed in a computerized device provides associated processing operations as explained herein to provide collaboration between software applications. The computer program logic, when executed on at least one processor within a computing system, causes the processor to perform the operations (e.g., the methods) indicated herein. Such arrangements are typically provided as software, code and/or other data structures arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC) or as downloadable software images in one or more modules, shared libraries, etc. The software or firmware or other such system configurations can be installed onto a computerized device to cause one or more processors, controllers or circuits in the computerized device to perform the techniques explained herein. Software processes that operate in a collection of computerized devices, such as in a group of servers, hosts or other entities can also provide the system disclosed herein. The system can be distributed between many software processes on several computers, or all processes could run on a small set of dedicated computers, or on one computerized device alone.

It is to be understood that the system can be embodied strictly as a software program, as software and hardware, or as hardware alone and may be implemented within one or more computer systems. Example embodiments may be implemented within the Oracle Collaboration Suite Software application manufactured by Oracle Corporation of Redwood Shores, California, USA.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of certain embodiments.

DETAILED DESCRIPTION

Figure 1:
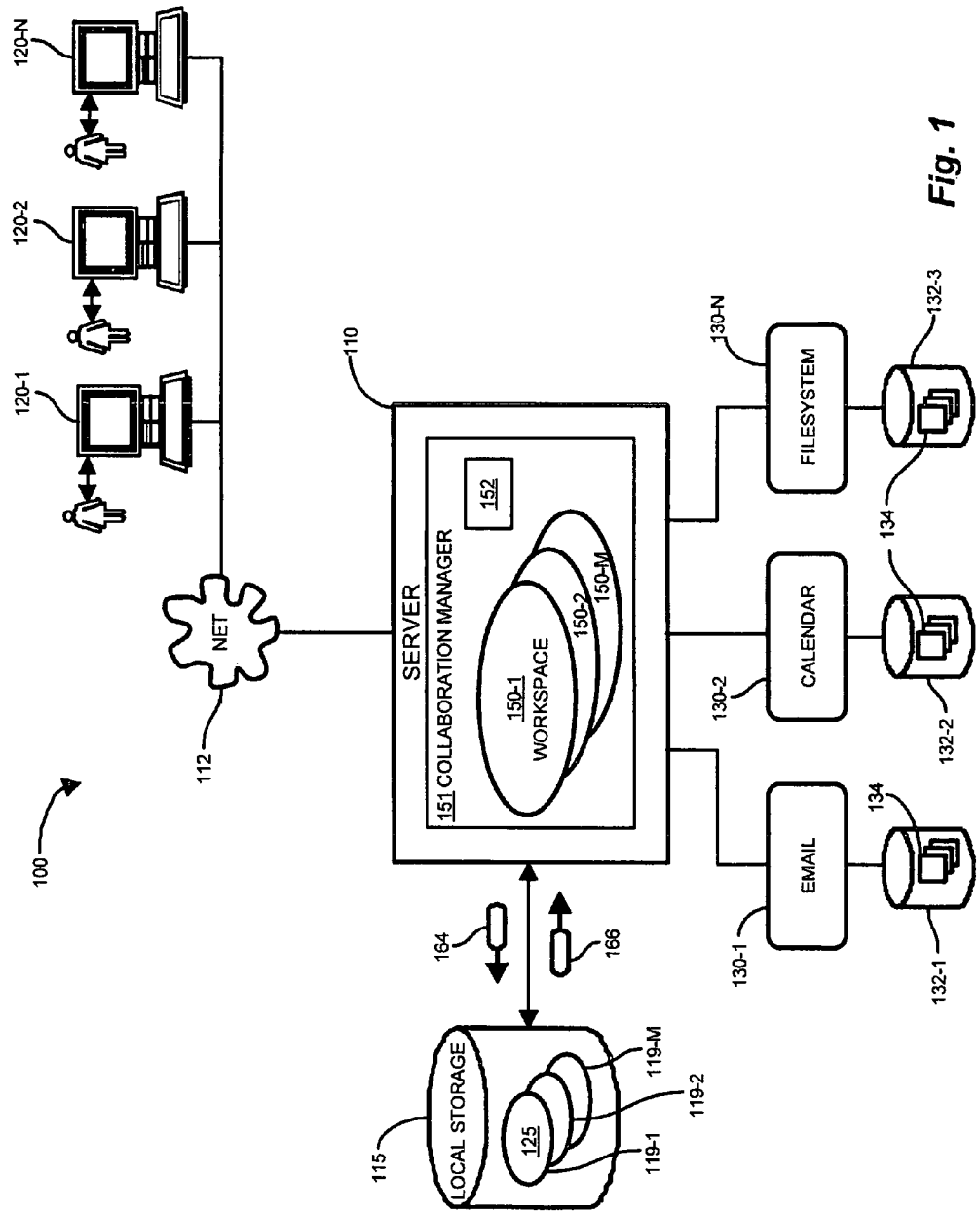
FIG. 1 is an example collaboration environment suitable for user in explaining operation of the collaboration system disclosed herein.

FIG. 1 illustrates an exemplary collaboration environment 100 suitable for use in explaining example configurations of the system disclosed herein. Referring to FIG. 1, the collaboration environment 100 includes a collaboration server 110 and a plurality of users 120-1 . . . 120-N (120 generally) shown as computer systems interconnected via a network 112 such as the Internet, a local or wide area network, virtual private network, or other communications medium. The collaboration server 110 operates a collaboration manager 151 that implements one or more collaboration workspaces 150-1 through 150-M that provide collaborative access to a plurality of software applications 130 on behalf of the users 120. In this example, the applications 130 include an electronic mail application 130-1, a calendar application 130-2 and a file system application 130-N. The applications 130 are shown by way of example only and are not intended to be a comprehensive list of applications accessible from the collaborative workspaces 150. Any other applications such as a threaded discussion application can be included as well. Generally, the applications 130 provide various services to the users 120 via the workspace 150 and the network 112.

As will be explained in more detail, the collaboration manager 151 in this example configuration is a software application that allows a user 120 to instantiate a new workspace 150-1 and include some or all of the applications 130 for collaborative access by users of the new workspace 150-1. When the user such as an administrator includes an application 130 into a workspace 150, the collaboration manager 151 operates or interfaces with the application 130 (e.g., via an API to that application) to create a respective application container 132-1 . . . 132-3 (132 generally) for storing application data 134 specific to that application 130 for that workspace 150, therefore relieving the workspaces 150 from storing the application data 134 on behalf of the users 120. As an example, if the electronic mail application 130-1 is included within each of the workspaces 150-1 through 150-M, the collaboration manager 151 causes the electronic mail application 130-1 to create M application containers 132 (one for each of the M workspaces, at the time of creation of those workspaces) that each contain a respective mailbox 134 and a respective instantiation of a workspace user to send, receive and store electronic mail data on behalf of users operating that workspace 150. Thus, for each application 130 included in a workspace 150, a collaboration manager 151 creates an application specific container 132 in the application 130 for storing workspace-generated content related to that application. As additional examples, the collaboration manager 151 creates a respective folder 132-3 in a file management application 130-N for storing all the file content of each workspace 150, and creates a respective special user 132-2 in a calendaring application 130-2 for storing all the meetings created in the workspaces 150, and creates a respective discussion facility in a discussion application (not shown in this example) for storing all the discussion topics/threads created in the workspaces 150, and so forth.

Figure 2:
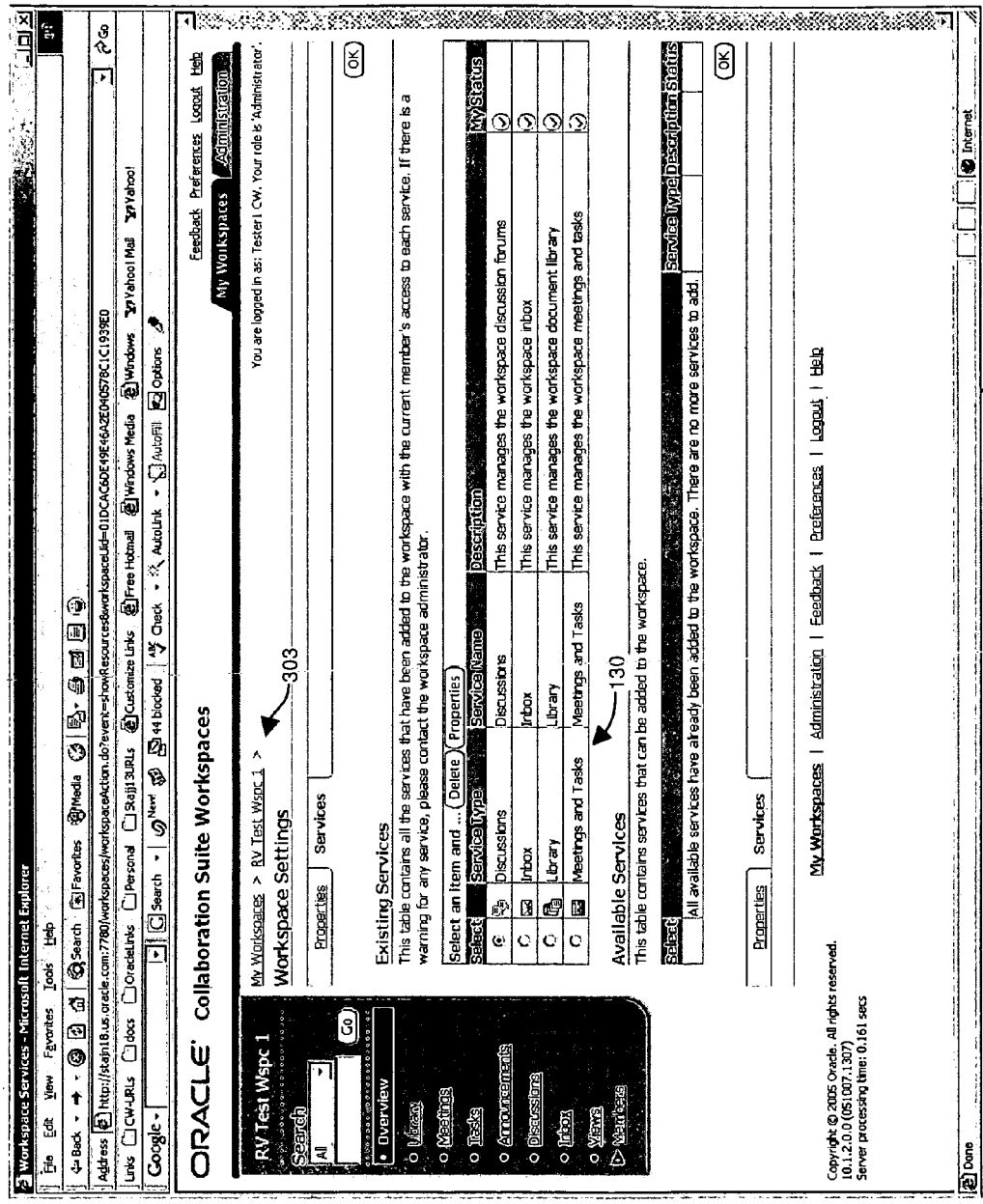
FIG. 2 is a screen shot showing workspace settings associated with a collaboration manager.

FIG. 2 is a screenshot from an Oracle Collaboration Suite Workspaces software application that shows an administration graphical user interface 301 that allows an administrative user 120 of a workspace named "RV_Text_Wsps_1" (shown at location 303 in FIG. 2) to add services (i.e. applications 130) to a workspace 150. The graphical user interface 301 shown in FIG. 2 is an interface to control the unified access control process 152. In this example (in FIG. 2), the administrator has added four applications (generally referenced as 130 in this figure) including a discussion application, an electronic mail service (Inbox), a library server to manage workspace documents, and a meetings and tasks service to manage workspace appointments. Note the names of these applications/services as presented by the workspace 150 can be different than actual names of the applications themselves.

Figure 3:
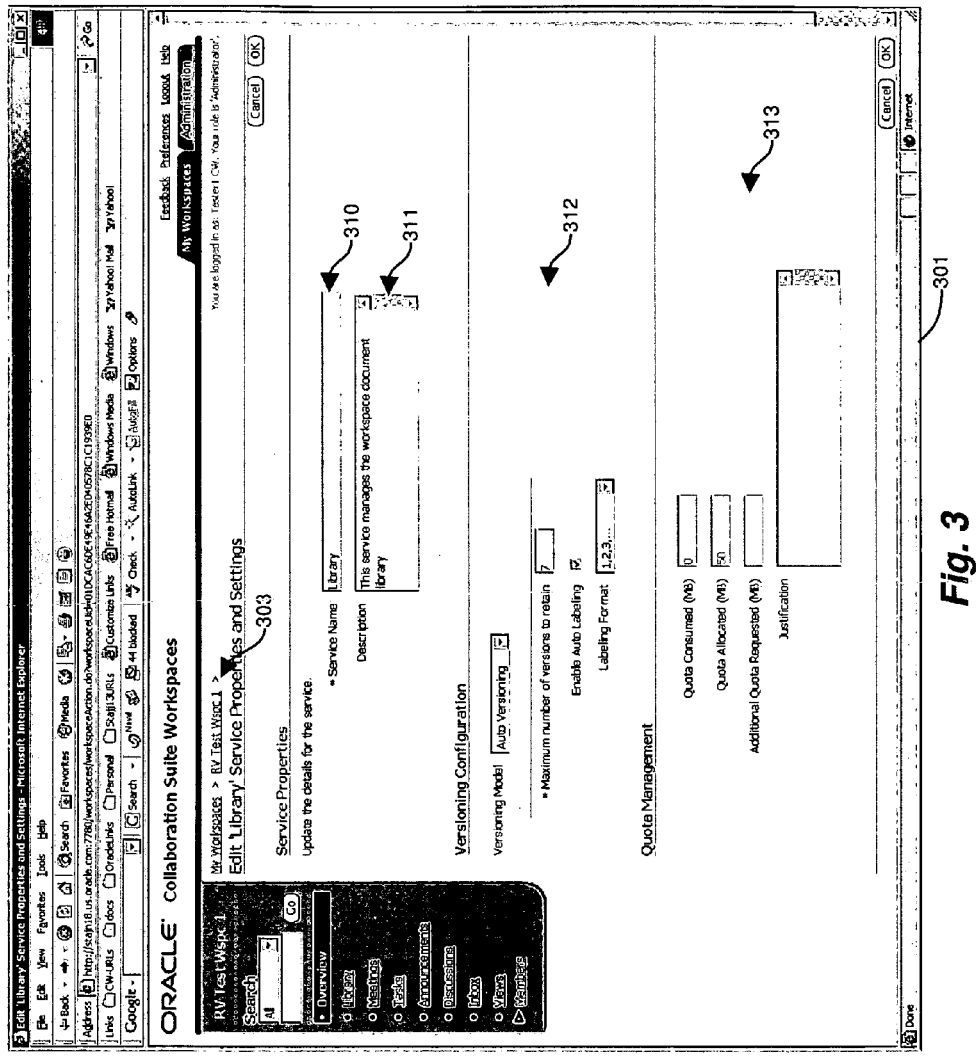
FIG. 3 is a screen shot showing service properties associated with a collaboration manager.

FIG. 3 is a screenshot that shows an administration graphical user interface that allows an administrative user 120 of the workspace named "RV_Text_Wsps_1" (shown at location 303) to edit properties of a particular service (i.e. an instance of an application 130), which in this example screenshot is the Library service. The properties in this example include the name 310 of the service, a description 311 and version 312 and quota properties 313 of this Library service. Note for different services 130 there may be different property management graphical user interfaces similar in nature to graphical user interface 301 in FIG. 3.

Returning attention back to FIG. 1, in addition to respective application containers 132 that each application 130 maintains on behalf of each workspace 150 that include that application 130, the collaboration manager 151 creates, for each workspace 150, a corresponding workspace container 119 that contains workspace metadata 125 that identifies information about particular applications 130 included within the workspace 150 to which that metadata 125 corresponds. The metadata 125 in each workspace container 119-1 through 119-M for each workspace 150 generally stores information that provides collaborative users 120 access to the applications 130 from the workspaces 150 as will be explained herein.

In one example configuration the collaboration manager 151 stores, within a respective workspace container 119 for each workspace 150, mapping information for each application included in the workspace 150 that identifies the storage area (e.g. a path to a specific directory on a disk, or an identity of the application data store) of the application container 132 for that application 130 included in that workspace 150. The collaboration manager 151 also preferably stores workspace properties, such as name, description, path, owner etc. in the metadata 125 within each respective workspace container 119 for each workspace 150. The collaboration manager 151 also stores, in each respective workspace container 119 for each workspace 150, information about relationships created between workspace entities such as files, electronic mails, attachments, meetings, etc. created in application containers 132 for different applications 130. For example, the relationship between a file attached to a meeting can be maintained in such relationship information.

Details of identifying and maintaining relationships between entities created by applications in a workspace are provided in co-pending patent application entitled METHOD AND APPARATUS FOR DEFINING RELATIONSHIPS BETWEEN COLLABORATION ENTITIES IN A COLLABORATION ENVIRONMENT having U.S. Ser. No. 11/291,381 filed on the same day as the present invention and assigned to the same Assignee as the present invention.

The collaboration manager 151 can also store, in each respective workspace container 119 for each workspace 150, information needed for handling faults in the workspace in order to attempt fault recovery. Details of identifying and recovering from faults in a workspace are provided in co-pending patent application entitled METHOD AND APPARATUS FOR PROVIDING FAULT TOLERANCE IN A COLLABORATION ENVIRONMENT having U.S. Ser. No. 11/291,351 filed on the same day as the present invention and assigned to the same Assignee as the present invention.

Also in this example configuration, the collaboration manager 151 can store, in each respective workspace container 119 for each workspace 150, template management information allowing a user to create workspaces from templates of formerly created workspaces to make workspace creation more efficient. Details of template creation and workspace instantiation form templates are provided in co-pending patent application entitled METHODS AND APPARATUS FOR DEFINING A COLLABORATIVE WORKSPACE having U.S. Ser. No. 11/291,350 filed on the same day as the present invention and assigned to the same Assignee as the present invention. The entire teachings and content of the aforementioned three co-pending patent applications are hereby incorporated by reference in their entirety.

The collaboration management system 151 shown in FIG. 1 further provides a unified access control process 152 within the collaboration manager 151 that provides a secure environment for information management. The unified access control process 152 hides the complexities of different access control models of applications 130 included in a workspace 150 using a role-based access control model. Generally, a role is a collection of privileges that users 120 can perform on entities such as application data 134 created via the applications 130. The unified access control process 152 allows each workspace 150 to define a set of system- and user-defined roles within its metadata 125. For instance, administrator, reader and writer are examples of system-defined roles, while scientist and engineer are examples of user-defined roles. The unified access control process 152 controls access to workspace content such as applications (and entities such as application data 134 created by applications within the application container 132 for that workspace 150) by assigning these roles to workspace users 120. The unified access control process 152 enforces a workspace role inside an application 130 in various ways. In one configuration, if supported by the application 130, the unified access control process 152 creates an equivalent (i.e. similar) role in the application 130 for privileges contained in the workspace role that applies to the entities 134 contained in or created by the application 130. When the unified access control process 152 grants or revokes a workspace role to or from a user 120, the unified access control process 152 calls the application 130 to grant or revoke the equivalent application specific role to or from that user 120.

Figure 4:
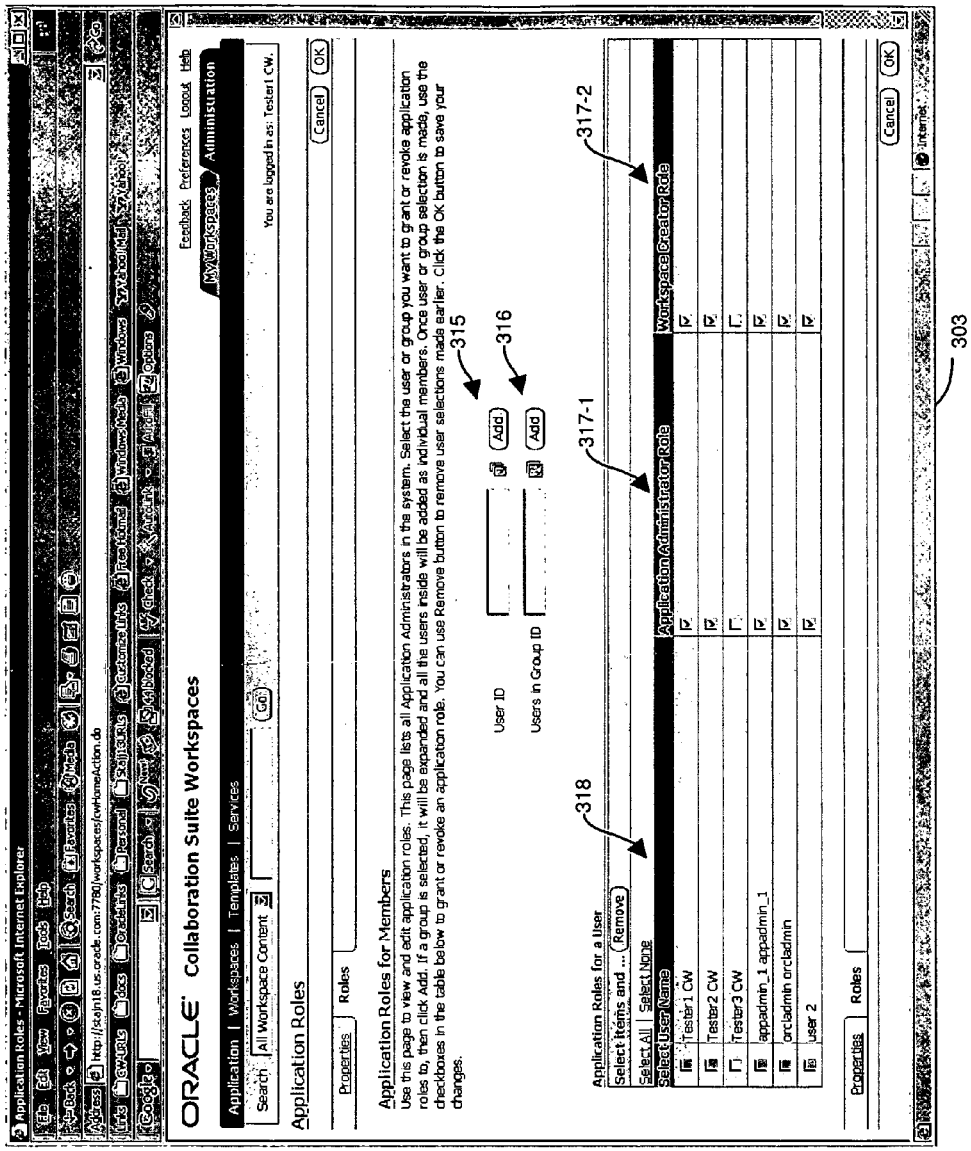
FIG. 4 is a screen shot showing application roles associated with a collaboration manager.

FIG. 4 is a screenshot from an Oracle Collaboration Suite Workspaces software application that shows an administration graphical user interface 303 that allows an administrative user 120 to add users (with a user ID 315 and user group ID 316) and assign roles 317-1 and 317-2 to those users. Using the graphical user interface 303, specific users listed in location 318 can have roles assigned or unassigned as needed. FIG. 4 thus generally shows the granting/revoking of system-wide roles and that is done by an administrator of the entire system.

Figure 5:
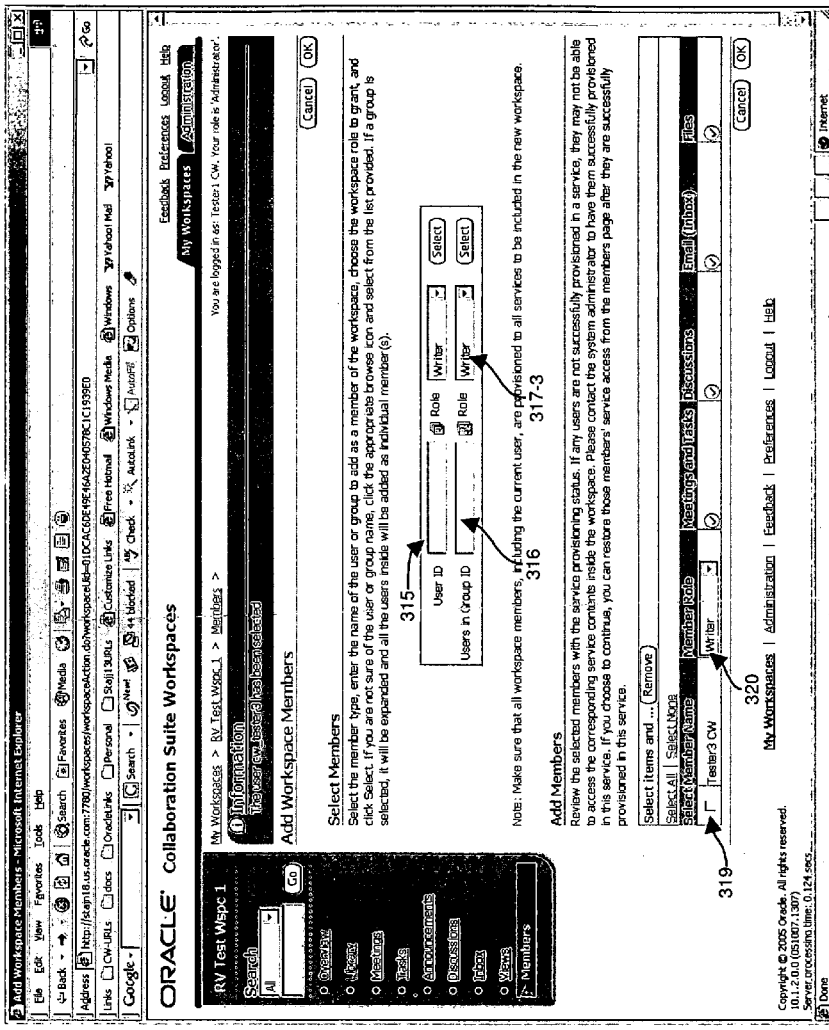
FIG. 5 is a screen shot showing addition of workspace member for a collaboration manager.

FIG. 5 is another example graphical user interface that allows an administrator user 120 to assign roles 317-3 to a particular user indicated at locations 315 and 316. As shown at location 319, roles for specific applications 130 can be selected for a user identified at location 320.

Returning attention back to FIG. 1, in another configuration, when the unified access control process 152 grants or revokes a workspace role to or from a user 120, for each privilege contained in the workspace role that applies to an entity 134 maintained by an application 130, the unified access control process 152 calls the application 130 to grant or revoke the application specific privilege to or from the user 120. Since the unified access control process 152 maps workspace roles to native access control constructs of the applications 130, the workspace roles and the associated privileges are honored for all access paths to the applications 130. As an example, for the sample workspaces 150 shown in FIG. 1, the unified access control process 152 can maintain permissions and privilege mappings between the workspace 150, applications 130 and users as will be explained in more detail.

From the foregoing example descriptions, the system disclosed herein allows multiple applications 130 that users need for managing personal or team information to be unified by identifying their content 134 in a metadata-based workspace 150. The actual application data content 134 of an application 130 is logically included in a workspace 150 through the user of metadata 125. All the application content 134 and associated application privilege information is maintained by the application 130 itself, while the workspace 150 physically only contains the metadata 125 sufficient for locating this content 134 in the applications 130.

Figure 6:
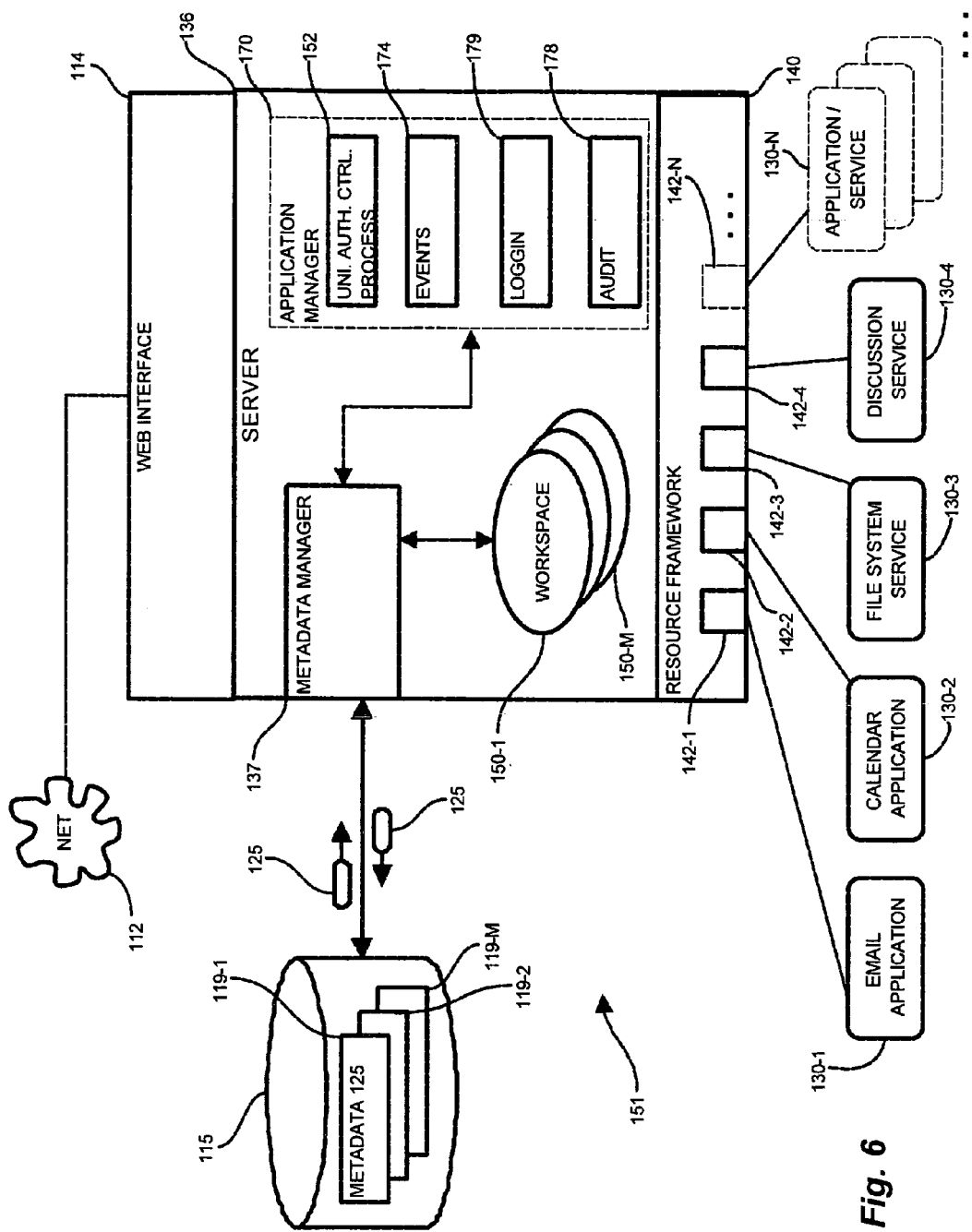
FIG. 6 is an example software architecture of a collaboration manager as disclosed herein.

FIG. 6 is a block diagram showing further details of an exemplary software architecture of a collaboration manager 151 operable to maintain metadata providing access to applications 130 on behalf of users 120 logged into the workspace. In this example, the collaboration manager 151 includes a web interface 114, a workspace server 136, and a resource framework 140 having adaptors 142-1 . . . 142-N (142 generally) for each application 130 that the server 110 supports. The workspace server 136 may include a plurality of workspaces 150-1 . . . 150-M, each of which may access any of the applications 130-1 through 130-N via the adaptors 142 within the resource framework 140. The adaptors 142 provide the appropriate API calls and sub-routines or object libraries to allow a workspace 150 to control an application 130 to perform application related functions such as creation of a workspace user account to operate the application, creation of an application container 132 for storage of application data 134 by the application 130, and to control general operational features of the application such as transmission of electronic mail, creation of calendar appointments, and so forth. Depending upon the application, the adapters 142 can allow the workspaces 150 to present a graphical user interface of the applications 130 (some or all) to a user 120 of the workspace 150 as if that user were independently operating the application in standalone mode (i.e., as if the user had accessed the application outside of the workspace), but under the auspices of the workspace user account created when the application was included in the workspace (i.e. at workspace creation time). Alternatively, the adaptor 142 can simply relay data from the application 130 to the workspace 150 and the workspace can provide its own graphical user interface or client for representation of that data to the users 120. In such a case, the application 130 can be used for its back-end (i.e. non-graphical) processing capabilities and the presentation of the application data 134 to the user 120 is left up to the workspace 150. In either configuration, the applications 130 can be replaced with different versions of software from the same or from different vendors, and only the adaptor may (or may not) need to be changed to accommodate the new version of the application.

Within the workspace server 136, a metadata manager 137 operates to perform management of the metadata 125 within each workspace container 119. Further details of metadata creation, use and management will be presented shortly. Additionally, an application manager 170 performs various administrative functions for allowing the workspaces 150 to employ the applications 130, and includes an unified access control process 152, an events process 174 and an audit process 178. The authorization manager 152 performs access control from the workspaces 150 to the applications 130. An events process 174 processes events such as user notifications from the applications 130. A login process 179 performs user login operations for a respective workspace. An audit process 178 maintains a log of application accesses for compliance with auditing and regulatory requirements, such as government mandated reporting. Other processes may be included for coordinating workspace 150 invocations of the applications 130 that are not illustrated in this example. Further details of operation of configurations disclosed herein will now be provided with reference to the flow charts of processing steps in FIGS. 7 through 10.

Figure 7:
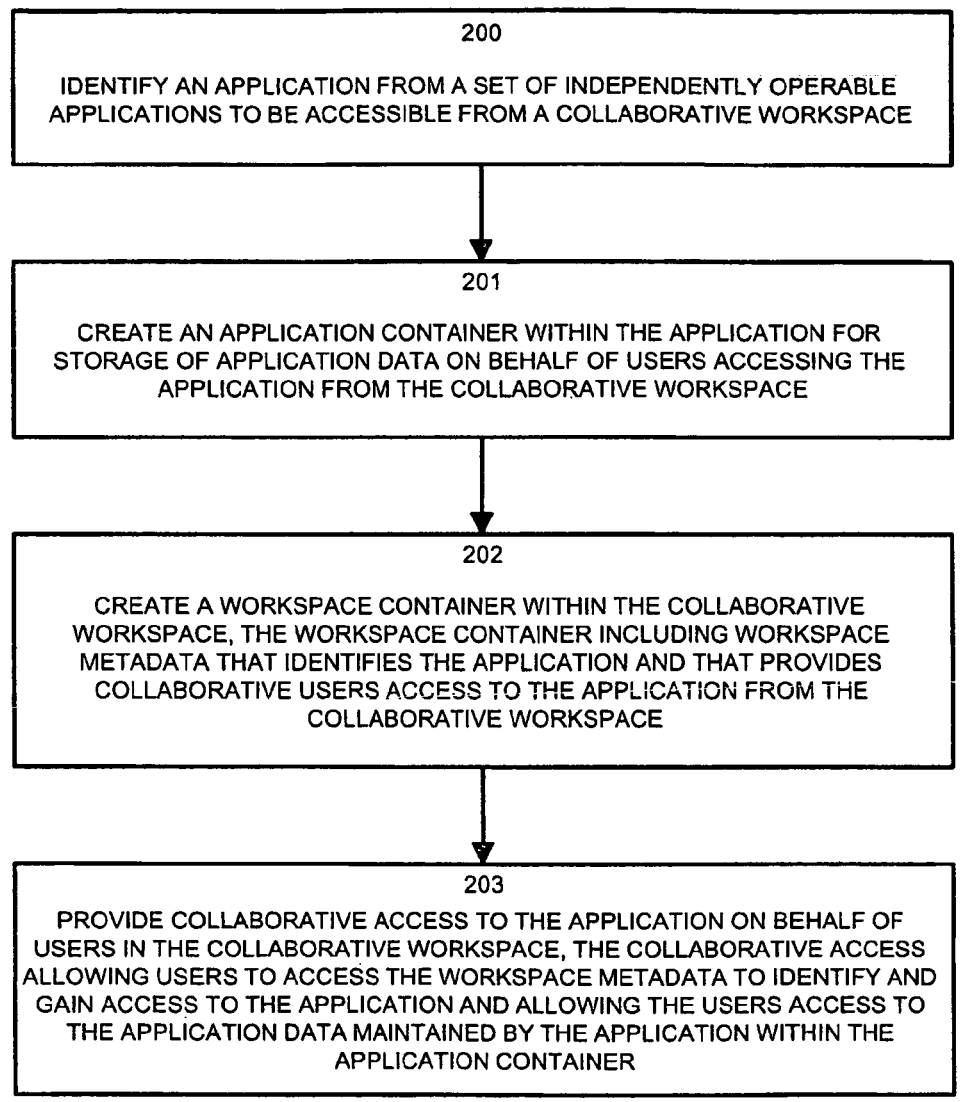
FIG. 7 is a flow chart of high-level processing steps that a collaboration manager as disclosed herein performs to provide collaborative access to applications.

FIG. 7 is a flow chart of processing steps that the collaboration manager 151 performs to provide collaborative access to an application 130 on behalf of users 120.

In step 200, the collaboration manager 151 identifies an application 130 (one or more) from a set of independently operable applications to be accessible from a collaborative workspace 150. This processing is done under control of a user 120 such as an administrator of the workspace 150 who is creating a new workspace.

In step 201, the collaboration manager 151 creates, for each application 130 identified in step 200, an application container 132 within the application 130 for storage of application data 134 on behalf of users 120 accessing the application 130 from the collaborative workspace 150. Creation of an application container for use by the workspace varies depending upon the application involved, but generally involves creation of a data storage area reserved for use in storing data managed by that application that is created under the identity of the workspace. This processing may also include creation of a user account (such as a mailbox for electronic mail, or a user for the calendar application) for the workspace itself, such that the workspace appears to the application as a user. In such cases, the collaboration manager 151 provides the users 120 that operate the applications 130 from within the workspace 150 with proxy access to the applications 130 under the identity of the workspace user created for that application 130 by the collaboration manager 151 (see below).

In step 202, the collaboration manager 151 creates a workspace container 119 within (i.e., maintained and stored by) the collaborative workspace 150. The workspace container 119 includes workspace metadata 125 that identifies the application(s) 130 and that provides collaborative users 120 access to the application(s) 130 from the collaborative workspace 150. Details of this processing have been outlined above and will be explained more fully below.

In step 203, the collaboration manager 151 provides collaborative access to the application(s) 130 in the workspace 150 on behalf of users 120 in the collaborative workspace 150. The collaborative access allows the users 120 to access the workspace metadata 119 to identify and gain access to the application(s) 130 and allows the users 120 access to the application data 134 maintained by the application(s) 130 within the application container(s) 132.

Using the metadata approach, the applications 130 can remain fully operational in standalone mode and can allow users 120 to operate with any one or all of the applications 130 via non-workspace access. However, when logged into the workspace 150, users access the applications 130 as if they were a single collaborative workspace user. For example, the workspace 150-1 maintains an electronic mail account with the electronic mail application 130-1 and thus users 120 logged into the workspace 150-1 that send or receive electronic mail do so under the identity of the workspace using the workspace electronic mail account. Thus workspace control of applications 130 is performed as if the workspace 150 were a user of the application itself and the users logged into the workspace are insulated from the applications 130.

Figure 8:
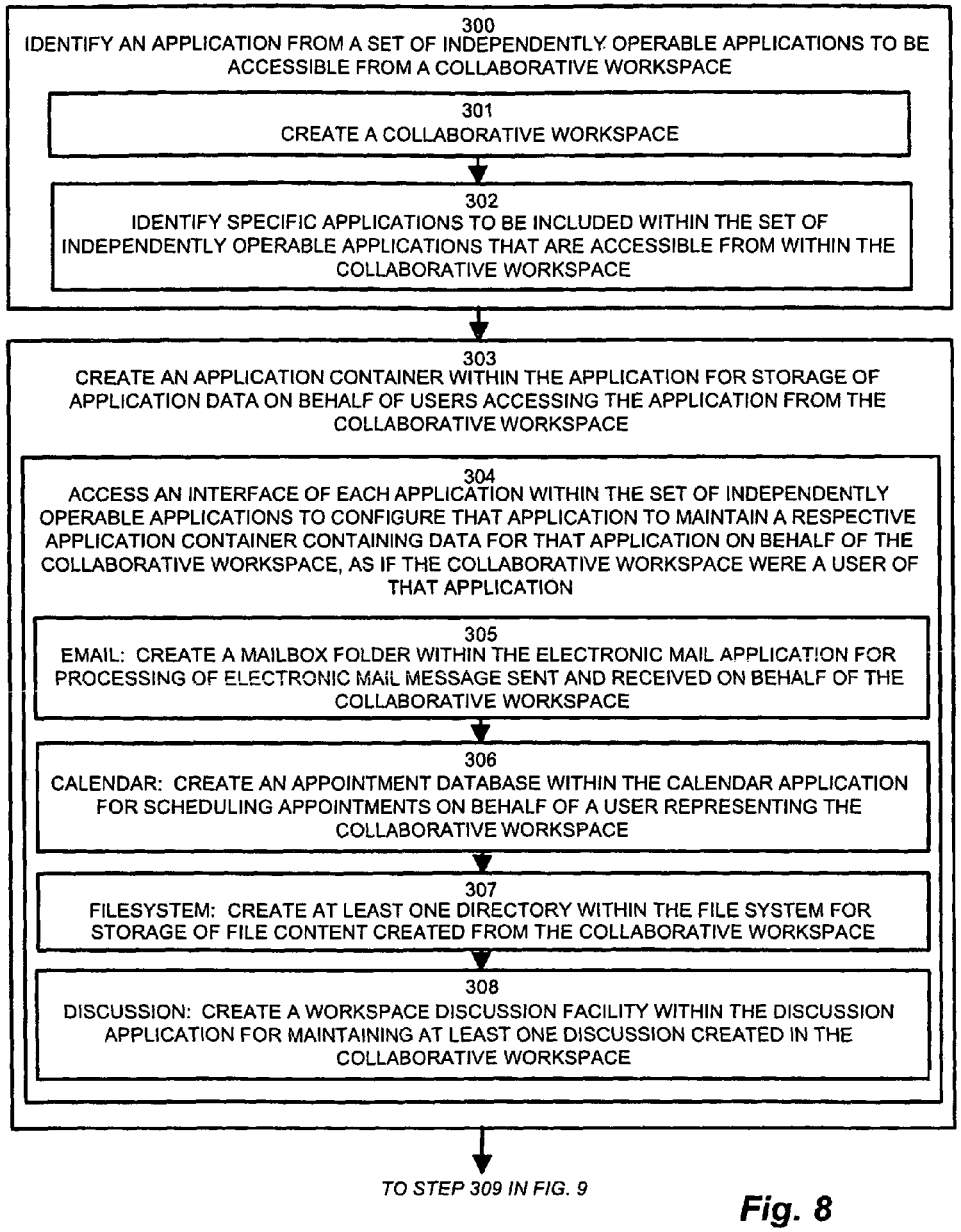
FIGS. 8, 9 and 10 are a flow chart of detailed processing steps showing operation of a collaboration manager in accordance with various configurations disclosed herein.
Figure 9:
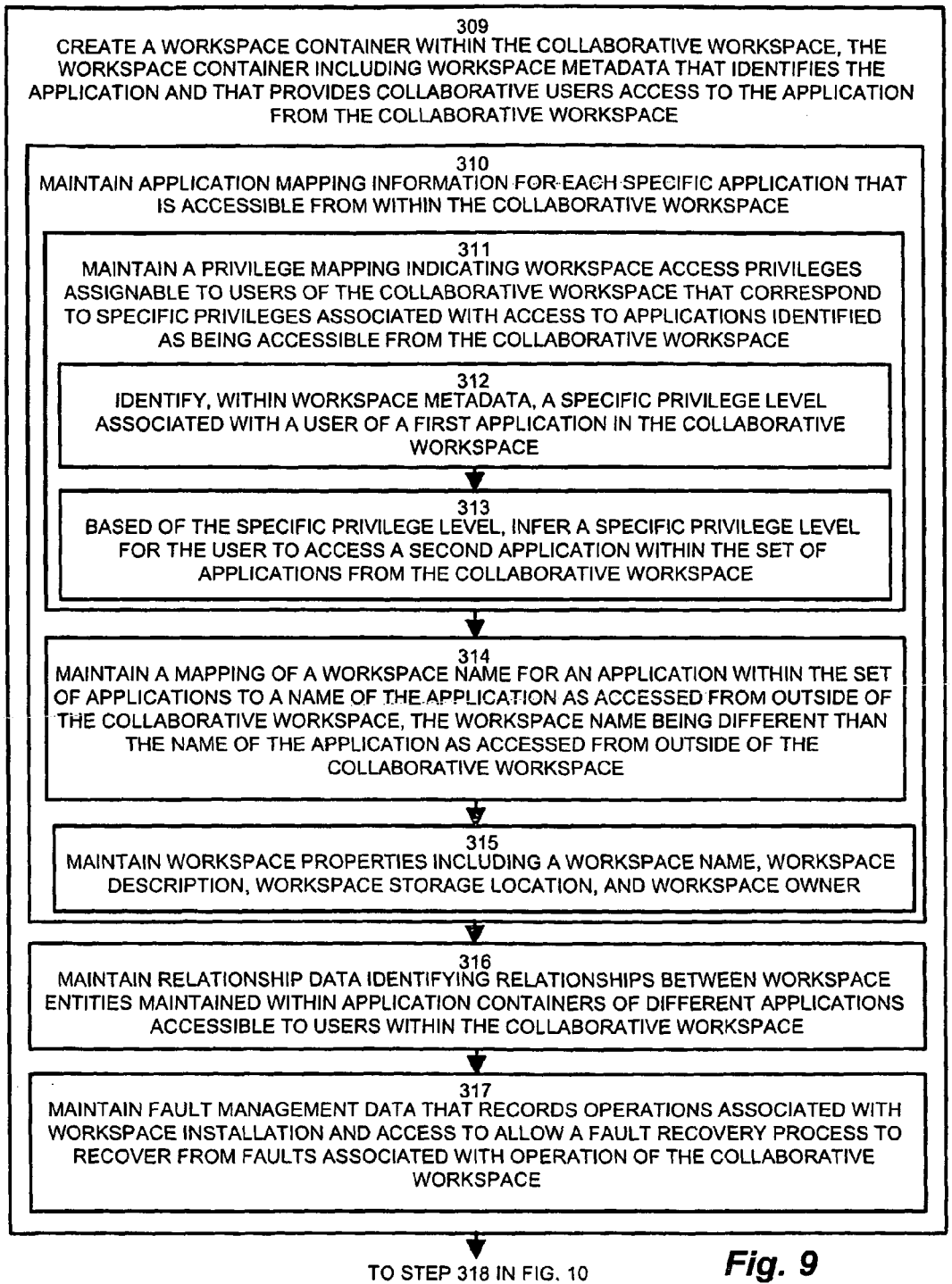
Figure 10:
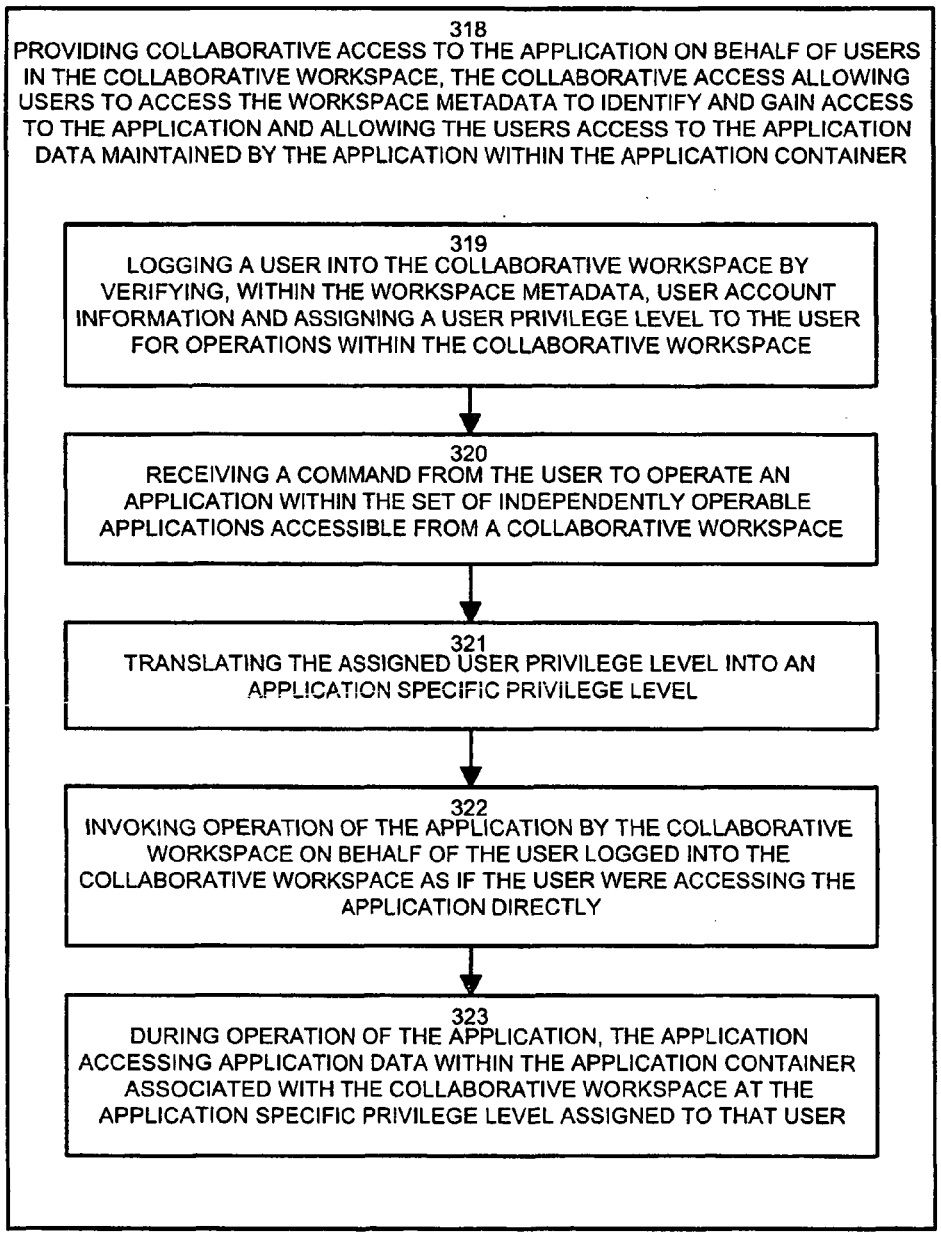

FIGS. 8, 9 and 10 are a single flow chart of processing steps that the collaboration manager 151 performs to provide workspace collaboration via the user of metadata, beginning with the creation of a workspace 150, instantiation of metadata 125 and application containers 132, and use of these constructs to allow users to perform collaboration.

In FIG. 8 at step 300, the collaboration manager 151 identifies an application 130 from a set of independently operable applications to be accessible from a collaborative workspace 150. Steps 301 and 302 show sub-steps of this processing.

In step 301, the collaboration manager 151 creates a collaborative workspace 150. This can be through the user of technology referenced in the aforementioned co-pending patent application related to the user of templates to create workspaces 150.

In step 302, the collaboration manager 151 identifies specific applications 130 to be included within the set of independently operable applications that are accessible from within the collaborative workspace. An administrator of the workspace can chose which applications are to be included in the workspace as was shown above in FIG. 2.

In step 303, the collaboration manager 151 creates an application container 132 within the application(s) 130 for storage of application data 134 on behalf of users 120 accessing the application 130 from the collaborative workspace 150. Sub-step 304 shows details of this processing.

In step 304, the collaboration manager 151 accesses an interface of each application 130 (e.g. via an adapter 142) within the set of independently operable applications to configure that application 130 to maintain a respective application container 132 containing data 134 for that application on behalf of the collaborative workspace 150, as if the collaborative workspace were a user of that application. Sub-steps 305 through 308 show details of this processing for different types of applications including electronic mail, calendar, file system and discussion applications 130 for a particular workspace 150-1.

In step 305, the application 130 is an independently operable electronic mail application and the collaboration manager 151 creates a mailbox folder as the application container 134 within the electronic mail application for processing of electronic mail message sent and received on behalf of the collaborative workspace 150-1.

In step 306, the application 130 is an independently operable calendar application and the collaboration manager 151 creates an appointment database as the application container 134 within the calendar application for scheduling appointments on behalf of a user representing the collaborative workspace 150-1.

In step 307, the application 130 is an independently operable file system application and the collaboration manager 151 creates at least one directory within the file system as the application container 134 for storage of file content created from the collaborative workspace 150-1.

In step 308, the application 130 is an independently operable discussion application and the collaboration manager 151 creates a workspace discussion facility within the discussion application as the application container 134 for maintaining at least one discussion created in the collaborative workspace 150-1.

As noted above, other types of applications would have constructs created within them as application containers for each workspace 150 that included that application for collaborative access by users 120. Note that the collaboration manager 151, via adapters 142, creates a respective application container 132 within each application for each workspace that includes that application.

FIG. 9 is a continuation of the flow chart of processing steps from FIG. 8 and shows details concerning creation of metadata 125 within a workspace container 119.

In step 309, the collaboration manager 151 creates a workspace container 119 within the collaborative workspace 150 that includes workspace metadata 125 that identifies the application(s) 130 and that provides collaborative users access to the application(s) 130 from the collaborative workspace 150. The workspace container is a storage area for maintaining metadata that is generally related to the workspace. Depending upon the configuration, the metadata 125 contains data for such things as the user account (e.g. name, password, etc.) and user access privileges and roles (as shown in FIGS. 4 and 5) for applications included in a workspace, the location of the applications 130 and application containers 132 for each application included in the workspace 150, as well as relationship information, fault tolerance data, workspace policy data (to be explained) and any other workspace related information that is to be persistently stored. By separating this information from the actual application instances and application data, the workspace is metadata driven and does not require special operation of the applications 130. Likewise, the applications are not constrained in their operability by being included in one or more workspaces 150. As such, users 120 are free to operate the applications 130 outside of the scope of the workspace to their full level of functionality. Steps 310 through 317 provide further processing details concerning use of metadata 125 to allow collaborative access to workspaces 150.

In step 310, the collaboration manager 151 maintains application mapping information 125 (i.e., metadata) for each specific application that is accessible from within the collaborative workspace. The application mapping information 125 identifies a location, respective to the application 130, of the application container 132 that stores application data 134 on behalf of users 120 accessing the application 130 from the collaborative workspace 150. Additionally, the application mapping information 125 identifies workspace access data identifying user access information allowing a plurality of users of the collaborative workspace to access the application(s) 130 from the collaborative workspace as if the collaborative workspace were a single user of that application. Generally, the application mapping information is metadata that allows the collaboration manager 151 to track information about users access to applications. Steps 311 through 315 show details of processing related to application mapping information metadata 125.

In step 311, the collaboration manager 151 maintains a privilege mapping indicating workspace access privileges assignable to users of the collaborative workspace that correspond to specific privileges associated with access to applications identified as being accessible from by the collaborative workspace. The unified access control process 152 uses the privilege mapping to determine what privileges a user logged into the workspace may have when operating as a proxy via the collaborative workspace user for access to the application. As an example, a user privilege table may appear as follows:

TABLE 1

User Privilege Table

| Workspace | User Name | Privilege level |
|---|---|---|
| Workspace 150-1 | Joe | Manager |
| Workspace 150-1 | Sally | Administrator |
| Workspace 150-1 | Bob | Engineer |
| Workspace 150-2 | Mike | Manager |
| Workspace 150-2 | Bill | Manager |
| Workspace 150-2 | Hank | Engineer |
| Workspace 150-2 | Jill | Engineer |
| ... | ... | ... |

Table 1 above indicates the workspace privilege level of each user for various workspaces. This table in combination with Table 2 below can be used to determine a privilege mapping between user level in the workspace and specific application privilege levels.

TABLE 2

Example Unified Access Control Table

| Workspace Privilege | Electronic mail Privileges | Calendar Privileges | Filesystem Privileges |
|---|---|---|---|
| Manager | Read, Review, Send, Delete | Create, Read, Remove | Read, write, Delete |
| Administrator | Delete, Send, Read | Create, Read, Remove | Read, write, Delete |
| Engineer | Read, Send | Create, Read | Read, write |
| ... | ... | ... | ... |

In step 312, the collaboration manager 151 identifies, within workspace metadata, a specific privilege level associated with a user of a first application in the collaborative workspace. This can be done in Table 1 above.

In step 313, based of the specific privilege level, the collaboration manager 151 infers a specific privilege level for the user to access a second application within the set of applications from the collaborative workspace. The collaboration manager 151 can use Table 2 above for this processing.

In step 314, the collaboration manager 151 maintains a mapping of a workspace name for an application within the set of applications to a name of the application as accessed from outside of the collaborative workspace. The workspace name can thus be different than the name of the application as accessed from outside of the collaborative workspace. An example of this is shown in Table 3 below:

TABLE 3

Workspace application name mapping

| Workspace | Workspace application 1 name | External Name and location |
|---|---|---|
| Workspace 150-1 | E-Mail | Outlook: c:/program files/MS Office/outlook/outlook.exe |
| Workspace 150-1 | Calendar | Appointment: c:/program files/appointment.exe |
| Workspace 150-1 | Filesystem | Filesystem: m:/user/workspaces/workspace150-1 |

In step 315, the collaboration manager 151 maintains workspace properties including a workspace name, workspace description, workspace storage location, and workspace owner. This information can be stored in a table similar to those above.

In step 316, the collaboration manager 151 maintains relationship data identifying relationships between workspace entities maintained within application containers of different applications accessible to users within the collaborative workspace. Details of relationship processing for workspaces are provided in the aforementioned referenced patent application (11/291381) formerly incorporated by reference.

In step 317, the collaboration manager 151 maintains fault management data that records operations associated with workspace installation and access to allow a fault recovery process to recover from faults associated with operation of the collaborative workspace. Details of relationship processing for workspaces are provided in the aforementioned referenced patent application (11/291351) formerly incorporated by reference.

FIG. 10 is a continuation of the flow chart of processing steps from FIG. 9 and shows details concerning runtime operation of a workspace 150 using metadata 125.

In step 318, the collaboration manager 151 provides collaborative access to the application(s) 130 on behalf of users 120 who are members of the collaborative workspace, thus allowing users to access the workspace metadata 125 (via the collaboration manager 151 and metadata manager 125) to identify and gain access to the applications 130 and allowing the users access to the application data 134 maintained by the applications 130 within the application containers 132. Substeps 319 through 323 show details of this processing.

In step 319, the collaboration manager 151 logs a user 120 into the collaborative workspace 150 by verifying, within the workspace metadata 125, user account information, and assigns a user privilege level to the user for operations within the collaborative workspace 150. Thus, based on an identity of the user 120, the collaboration manager 151 assigns a workspace access privilege level to the user as indicated in user account information for that user within the workspace access data metadata 125. Accordingly, for each application 130 the user accesses from the collaborative workspace 150, the collaboration manager 151 accesses the application as if the collaborative workspace 150 were a user of the application at a specific privilege level associated with that application, as indicated in the privilege mapping (as shown in the above tables), that corresponds to the assigned workspace access privilege level for the user operating the collaborative workspace 150.

In step 320, the collaboration manager 151 receives a command from the user to operate an application 130 within the set of independently operable applications accessible from a collaborative workspace.

In step 321, the collaboration manager 151 translates the assigned user privilege level into an application specific privilege level (e.g. using the above metadata).

In step 322, the collaboration manager 151 invokes operation of the application 130 by the collaborative workspace 150 on behalf of the user 120 logged into the collaborative workspace as if the user were accessing the application 130 directly (but in the name of the workspace).

In step 323, during operation of the application, the application 130 accesses application data 134 within the application container 132 associated with the collaborative workspace 150 at the application specific privilege level assigned to that user 120.

By using metadata, the system disclosed herein insulates a user from details concerning access control to applications, and insulates the applications from details of specific users. Collaboration is provided by having an application container 132 created within each application 130 in a workspace 150 and all users of a workspace 150 operate on the same application data 134 in the application container 132, no matter which user is logged into the workspace 150.

In alternative configurations of the collaboration manager 151, the collaboration manager is able to define a workspace policy within the workspace metadata 125. The workspace policy can be a table indicating a source operation to detect from a first application (e.g. detection of a specific file created in the file system 130-3) accessed from within the collaborative workspace and a corresponding target action to take within a second application (e.g. send an electronic mail via electronic mail application 130-1) available within the collaborative workspace upon occurrence of the source action. In this manner, the system can cause interoperations between applications in an automated manner. In this configuration, the collaboration monitors operation of the first application for operation of the source action and detects operation of the source action in the first application. In response, the collaboration manager 151 invokes the target operation in the second application as a result of detecting operation of the source action.

Those skilled in the art should readily appreciate that the programs and methods that provide a workspace for use in a collaboration environment as defined herein are deliverable to a processing device or as a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media. The operations and methods may be implemented in a software executable object. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components. The data such as metadata 125 may be stored in a database of any type.

While the system and method for providing a workspace in a collaboration environment has been particularly shown and described with references to embodiments thereof, it will be understood by those skilled in the art that various changes in form and details may be made therein without departing from the scope of the invention encompassed by the appended claims. Accordingly, the present invention is not intended to be limited.

What is claimed is:

1. A method providing collaborative access to an application, the method comprising:
    identifying an application from a set of independently operable applications to be accessible from a collaborative workspace;
    creating an application container managed by the application for storage of application data on behalf of users accessing the application from the collaborative workspace;
    creating a workspace container managed by the collaborative workspace, the workspace container including workspace metadata that identifies the application and that provides collaborative users access to the application from the collaborative workspace; and
    providing collaborative access to the application on behalf of users of the collaborative workspace, the collaborative access allowing users to access the workspace metadata to identify and gain access to the application and allowing the users access to the application data maintained by the application within the application container.

2. The method of claim 1 wherein identifying an application to be accessible from a collaborative workspace comprises:
    creating a collaborative workspace;
    identifying specific applications to be included within the set of independently operable applications that are accessible from within the collaborative workspace; and
    wherein creating an application container within the application for storage of application data on behalf of users accessing the application from the collaborative workspace comprises:
    accessing an interface of each application within the set of independently operable applications to configure that application to maintain a respective application container containing data for that application on behalf of the collaborative workspace, as if the collaborative workspace were a user of that application.

3. The method of claim 2 wherein creating a workspace container within the collaborative workspace including workspace metadata that identifies the application and that provides collaborative users access to the application from the collaborative workspace comprises:
    maintaining application mapping information for each specific application that is accessible from within the collaborative workspace, the application mapping information identifying:
    i) a location, respective to the application, of the application container that stores application data on behalf of users accessing the application from the collaborative workspace; and
    ii) workspace access data identifying user access information allowing a plurality of users of the collaborative workspace to access the application from the collaborative workspace as if the collaborative workspace were a single user of that application.

4. The method of claim 3 wherein maintaining workspace access data identifying user access information allowing a plurality of users of the collaborative workspace to access the application from the collaborative workspace comprises:
    maintaining a privilege mapping indicating workspace access privileges assignable to users of the collaborative workspace that correspond to specific privileges associated with access to applications identified as being accessible from by the collaborative workspace.

5. The method of claim 4 comprising:
    logging a user into the collaborative workspace;
    based on an identity of the user, assigning a workspace access privilege level to the user as indicated user account information for that user within the workspace access data; and
    for each application the user accesses from the collaborative workspace, accessing the application as if the collaborative workspace were a user of the application at a specific privilege level associated with that application, as indicated in the privilege mapping, that corresponds to the assigned workspace access privilege level for the user operating the collaborative workspace.

6. The method of claim 5 wherein maintaining a privilege mapping indicating workspace access privileges assignable to users of the collaborative workspace comprises:
    identifying, within workspace metadata, a specific privilege level associated with a user of a first application in the collaborative workspace; and
    based of the specific privilege level, inferring a specific privilege level for the user to access a second application within the set of applications from the collaborative workspace, as if the collaborative workspace were a user of the application at the inferred specific privilege level.

7. The method of claim 3 wherein maintaining application mapping information for each specific application that is accessible from within the collaborative workspace comprises:
    maintaining a mapping of a workspace name for an application within the set of applications to a name of the application as accessed from outside of the collaborative workspace, the workspace name being different than the name of the application as accessed from outside of the collaborative workspace.

8. The method of claim 3 wherein creating a workspace container within with the collaborative workspace including workspace metadata that identifies the application and that provides collaborative users access to the application from the collaborative workspace comprises:
    maintaining workspace properties including a workspace name, workspace description, workspace storage location, and workspace owner;

maintaining relationship data identifying relationships between workspace entities maintained within application containers of different applications accessible to users within the collaborative workspace; and maintaining fault management data that records operations associated with workspace installation and access to allow a fault recovery process to recover from faults associated with operation of the collaborative workspace.

9. The method of claim 2 wherein the set of independently operable applications includes at least one of:

i) an independently operable electronic mail application and wherein creating an application container within the application comprises creating a mailbox folder within the electronic mail application for processing of electronic mail message sent and received on behalf of the collaborative workspace;

ii) an independently operable calendar application and wherein creating an application container within the application comprises creating an appointment database within the calendar application for scheduling appointments on behalf of a user representing the collaborative workspace;

iii) an independently operable file system application and wherein creating an application container within the application comprises creating at least one directory within the file system for storage of file content created from the collaborative workspace; and iv) an independently operable discussion application and wherein creating an application container within the application comprises creating a workspace discussion facility within the discussion application for maintaining at least one discussion created in the collaborative workspace.

10. The method of claim 1 comprising:

defining a workspace policy within the workspace metadata, the workspace policy indicating a source operation to detect from a first application accessed from within the collaborative workspace and a corresponding target action to take within a second application available within the collaborative workspace upon occurrence of the source action;

monitoring operation of the first application for operation of the source action;

detecting operation of the source action in the first application; and invoking the target operation in the second application as a result of detecting operation of the source action.

11. The method of claim 1 wherein providing collaborative access to the application on behalf of users in the collaborative workspace, the collaborative access allowing users to access the workspace metadata to identify and gain access to the application and allowing the users access to the application data maintained by the application within the application container comprises:

logging a user into the collaborative workspace by verifying, within the workspace metadata, user account information and assigning a user privilege level to the user for operations within the collaborative workspace;

receiving a command from the user to operate an application within the set of independently operable applications accessible from a collaborative workspace;

translating the assigned user privilege level into an application specific privilege level;

invoking operation of the application by the collaborative workspace on behalf of the user logged into the collaborative workspace as if the user were accessing the application directly; and during operation of the application, the application accessing application data within the application container associated with the collaborative workspace at the application specific privilege level assigned to that user.

12. The method of claim 2 further comprising independently operating the application in standalone mode under a workspace user account created when the application was included in the workspace.

13. The method of claim 2 further comprising presenting a graphical user interface of the applications to the user of the workspace as if that user were independently operating the application in standalone mode.

14. A computer system comprising:

a memory;

a processor;

an interconnection mechanism coupling the memory and the processor;

wherein the memory is encoded with a collaboration manager application that when performed on the processor, is operable as a collaboration manager process to provide collaborative access to an application by causing the computer system to perform the operations of:

identifying an application from a set of independently operable applications to be accessible from a collaborative workspace instantiated in the memory of the computer system;

creating an application container managed by the application for storage of application data on behalf of users accessing the application from the collaborative workspace;

creating a workspace container managed by the collaborative workspace, the workspace container including workspace metadata that identifies the application and that provides collaborative users access to the application from the collaborative workspace; and providing collaborative access to the application on behalf of users of the collaborative workspace, the collaborative access allowing users to access the workspace metadata to identify and gain access to the application and allowing the users access to the application data maintained by the application within the application container.

15. The computer system of claim 14 wherein identifying an application to be accessible from a collaborative workspace comprises:

creating a collaborative workspace;

identifying specific applications to be included within the set of independently operable applications that are accessible from within the collaborative workspace; and wherein creating an application container within the application for storage of application data on behalf of users accessing the application from the collaborative workspace comprises:

accessing an interface of each application within the set of independently operable applications to configure that application to maintain a respective application container containing data for that application on behalf of the collaborative workspace, as if the collaborative workspace were a user of that application.

16. The computer system of claim 15 wherein creating a workspace container within the collaborative workspace including workspace metadata that identifies the application and that provides collaborative users access to the application from the collaborative workspace comprises:

maintaining application mapping information for each specific application that is accessible from within the collaborative workspace, the application mapping information identifying:

i) a location, respective to the application, of the application container that stores application data on behalf of users accessing the application from the collaborative workspace; and ii) workspace access data identifying user access information allowing a plurality of users of the collaborative workspace to access the application from the collaborative workspace as if the collaborative workspace were a single user of that application.

17. The computer system of claim 16 wherein maintaining workspace access data identifying user access information allowing a plurality of users of the collaborative workspace to access the application from the collaborative workspace comprises:

maintaining a privilege mapping indicating workspace access privileges assignable to users of the collaborative workspace that correspond to specific privileges associated with access to applications identified as being accessible from by the collaborative workspace.

18. The computer system of claim 17 comprising:
logging a user into the collaborative workspace;
based on an identity of the user, assigning a workspace access privilege level to the user as indicated user account information for that user within the workspace access data; and
for each application the user accesses from the collaborative workspace, accessing the application as if the collaborative workspace were a user of the application at a specific privilege level associated with that application, as indicated in the privilege mapping, that corresponds to the assigned workspace access privilege level for the user operating the collaborative workspace.

19. The computer system of claim 18 wherein maintaining a privilege mapping indicating workspace access privileges assignable to users of the collaborative workspace comprises:

identifying, within workspace metadata, a specific privilege level associated with a user of a first application in the collaborative workspace; and
based of the specific privilege level, inferring a specific privilege level for the user to access a second application within the set of applications from the collaborative workspace.

20. The computer system of claim 16 wherein maintaining application mapping information for each specific application that is accessible from within the collaborative workspace comprises:

maintaining a mapping of a workspace name for an application within the set of applications to a name of the application as accessed from outside of the collaborative workspace, the workspace name being different than the name of the application as accessed from outside of the collaborative workspace.

21. The computer system of claim 16 wherein creating a workspace container within with the collaborative workspace including workspace metadata that identifies the application and that provides collaborative users access to the application from the collaborative workspace comprises:

maintaining workspace properties including a workspace name, workspace description, workspace storage location, and workspace owner;

maintaining relationship data identifying relationships between workspace entities maintained within application containers of different applications accessible to users within the collaborative workspace; and maintaining fault management data that records operations associated with workspace installation and access to allow a fault recovery process to recover from faults associated with operation of the collaborative workspace.

22. The computer system of claim 15 wherein the set of independently operable applications includes at least one of:

i) an independently operable electronic mail application and wherein creating an application container within the application comprises creating a mailbox folder within the electronic mail application for processing of electronic mail message sent and received on behalf of the collaborative workspace;

ii) an independently operable calendar application and wherein creating an application container within the application comprises creating an appointment database within the calendar application for scheduling appointments on behalf of a user representing the collaborative workspace;

iii) an independently operable file system application and wherein creating an application container within the application comprises creating at least one directory within the file system for storage of file content created from the collaborative workspace; and iv) an independently operable discussion application and wherein creating an application container within the application comprises creating a workspace discussion facility within the discussion application for maintaining at least one discussion created in the collaborative workspace.

23. The computer system of claim 14 comprising:
defining a workspace policy within the workspace metadata, the workspace policy indicating a source operation to detect from a first application accessed from within the collaborative workspace and a corresponding target action to take within a second application available within the collaborative workspace upon occurrence of the source action;
monitoring operation of the first application for operation of the source action;
detecting operation of the source action in the first application; and
invoking the target operation in the second application as a result of detecting operation of the source action.

24. The computer system of claim 14 wherein providing collaborative access to the application on behalf of users in the collaborative workspace, the collaborative access allowing users to access the workspace metadata to identify and gain access to the application and allowing the users access to the application data maintained by the application within the application container comprises:

logging a user into the collaborative workspace by verifying, within the workspace metadata, user account information and assigning a user privilege level to the user for operations within the collaborative workspace;
receiving a command from the user to operate an application within the set of independently operable applications accessible from a collaborative workspace
translating the assigned user privilege level into an application specific privilege level;

invoking operation of the application by the collaborative workspace on behalf of the user logged into the collaborative workspace as if the user were accessing the application directly; and during operation of the application, the application accessing application data within the application container associated with the collaborative workspace at the application specific privilege level assigned to that user.

25. The computer system of claim 15 further comprising at least one adaptor for allowing the workspace to present a graphical user interface of the applications to the user of the workspace as if that user were independently operating the application in standalone mode.

26. The computer system of claim 15 further comprising at least one adaptor for allowing the user to access the application under the workspace user account created when the application was included in the workspace.

27. A non-transitory computer-readable medium including computer program logic stored thereon that, when executed on a computer system, provides collaborative access to applications by causing the computer system to perform the operations of:

identifying an application from a set of independently operable applications to be accessible from a collaborative workspace;

creating an application container within the application for storage of application data on behalf of users accessing the application from the collaborative workspace; creating a workspace container within the collaborative workspace;

creating a workspace container within the collaborative workspace, the workspace container including workspace metadata that identifies the application and that provides collaborative users access to the application from the collaborative workspace; and providing collaborative access to the application on behalf of users in the collaborative workspace, the collaborative access allowing users to access the workspace metadata to identify and gain access to the application and allowing the users access to the application data maintained by the application within the application container.

* * * * *

UNITED STATES PATENT AND TRADEMARK OFFICE
CERTIFICATE OF CORRECTION

| | | |
|---|---|---|
| PATENT NO. | : 8,332,470 B2 | Page 1 of 1 |
| APPLICATION NO. | : 11/291352 | |
| DATED | : December 11, 2012 | |
| INVENTOR(S) | : Arun et al. | |

It is certified that error appears in the above-identified patent and that said Letters Patent is hereby corrected as shown below:

In column 7, line 42, delete "11/291,381filed" and insert -- 11/291,381 filed --, therefor.

In column 9, line 26, delete "adapters" and insert -- adaptors --, therefor.

In column 11, line 18, delete "adapter" and insert -- adaptor --, therefor.

In column 11, line 55, delete "adapters" and insert -- adaptors --, therefor.

In column 13, line 17, delete "of" and insert -- on --, therefor.

In column 13, line 54, delete "(11/291381)" and insert -- 11/291,381 --, therefor.

In column 13, line 61, delete "(11/291351)" and insert -- 11/291,351 --, therefor.

In column 15, line 7, after "devices," insert -- or --.

In column 16, line 45, in Claim 6, delete "of" and insert -- on --, therefor.

In column 16, line 61, in Claim 8, after "within" delete "with".

In column 19, line 46, in Claim 19, delete "of" and insert -- on --, therefor.

In column 19, line 61, in Claim 21, after "within" delete "with".

In column 20, line 65, in Claim 24, after "workspace" insert -- ; --.

Signed and Sealed this
Twelfth Day of March, 2013

Teresa Stanek Rea
*Acting Director of the United States Patent and Trademark Office*